Aug. 5, 1941.  J. C. DIXON  2,251,701
DRILL SUPPORT
Filed May 27, 1939
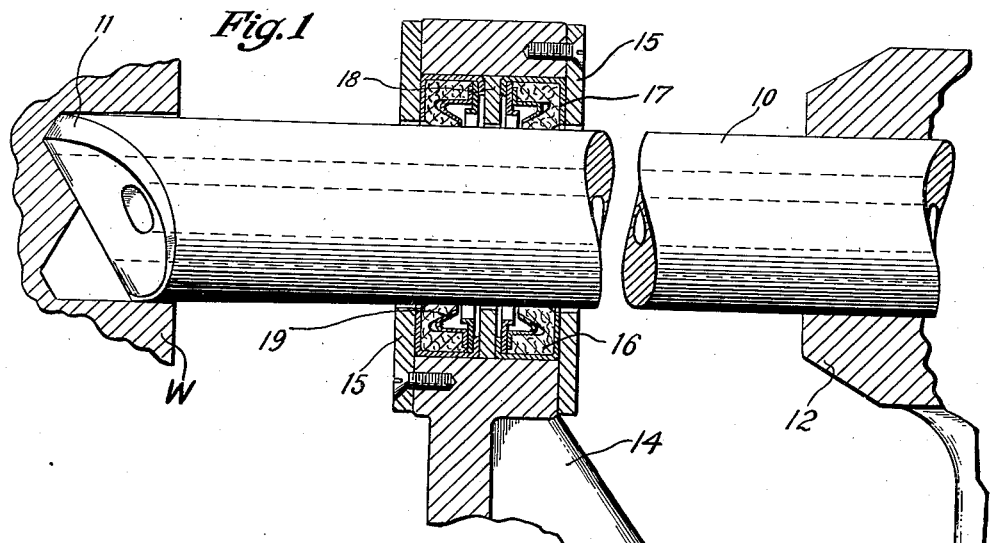
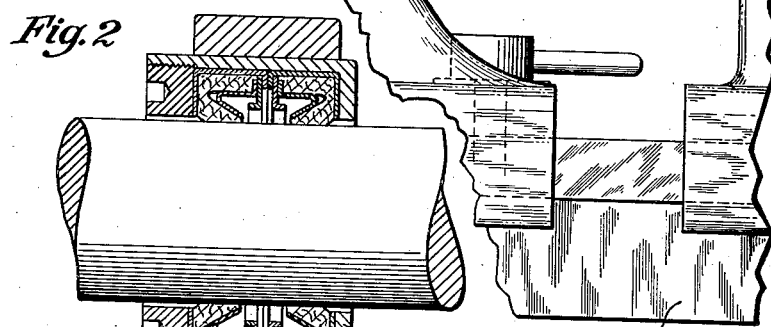
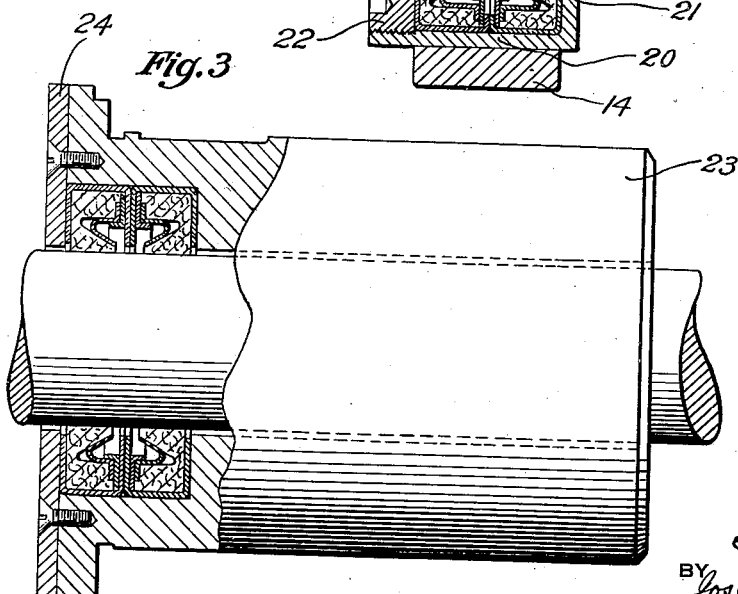
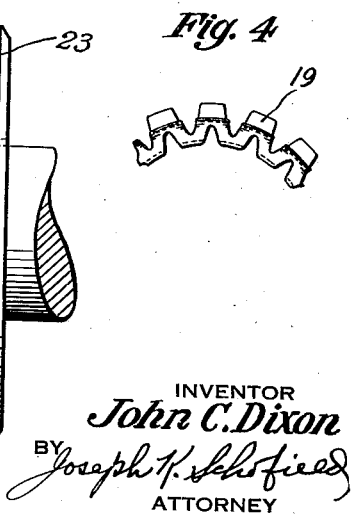
INVENTOR
John C. Dixon
BY Joseph K. Schofield
ATTORNEY Patented Aug. 5, 1941

2,251,701

UNITED STATES PATENT OFFICE 2,251,701

DRILL SUPPORT

John C. Dixon, Hartford, Conn., assignor to Niles-Bement-Pond Company, Hartford, Conn., a corporation of New Jersey Application May 27, 1939, Serial No. 276,045

2 Claims. (Cl. 77—59)

This invention relates to drilling machines and particularly to an improvement in deep hole drilling machines such as employed for boring or drilling rifle barrels and other small diameter elongated holes.

An object of the invention is to provide means to support a drill during operation at a point intermediate its length, the support having a resilient annular packing engaging the surface of the drill to maintain alinement of the drill, prevent vibration of the drill with attendant breakage of the drills and disagreeable sounds.

Another object of the invention is to provide resilient engaging members for the drill shank in the form of annular springs associated with the packing to force portions thereof firmly against the circumferential surface of the drill shank so that the drill will be firmly but resiliently supported by the packing throughout its complete circumference.

With the above and other objects in view, my invention may include the features of construction and operation set forth in the following specification and illustrated in the accompanying drawing.

In the accompanying drawing annexed hereto and forming a part of this specification, I have shown the invention adapted for application to a gun barrel drilling machine, but it will be understood that the invention can be otherwise embodied and that the drawing is not to be construed as defining or limiting the scope of the invention, the claims appended to this specification being relied upon for that purpose.

In the drawing:

Figure 1 is a front elevation of portions of a drilling machine having the shank supporting means forming the present invention.

Fig. 2 is a modified form of the resilient supporting member for a drill shank shown in Fig. 1.

Fig. 3 is a modified form of the mounting for the resilient supporting member shown in Fig. 1; and Fig. 4 is a detail view of a part of the invention.

In the above mentioned drawing there has been shown but one embodiment of the invention which is now deemed preferable, but it is to be understood that changes and modifications may be made within the scope of the appended claims without departing from the spirit of the invention.

Briefly and in its broadest aspect, the invention may include the following principal parts: First, a base on which may be mounted a work rotating and supporting member at one end and a drill support at the opposite end, means being provided for feeding movement of the members toward each other during operation; second, an elongated drill mounted in a support at one end and adapted to engage a work piece at its opposite end; third, an intermediate support preferably mounted directly on the base and adapted for slidable engagement thereon; fourth, annular resilient packing members within this support closely engaging the circumferential surface of the drill; fifth, annular spring members housed within the support and forcing portions of the bearing material firmly against the circumferential surface of the drill; and sixth, retaining means to maintain the bearings properly housed within the support.

In the operation of drilling elongated holes of relatively small diameter, such as gun barrels, the drill is necessarily slender and therefore apt to vibrate between extreme limits. This vibration interferes with the smooth drilling action, tends to break drills, and also gives rise to noisy operation. To eliminate these undesirable features the present invention provides means to exert firm resilient pressure upon the shank of the drill by one or more annular bearing members closely surrounding the drill shank. These members are sufficiently flexible to permit the passage of the cutting end of the drill through them and are supported within a metal support, portions of which closely surround the drill but have an opening therethrough sufficient for the passage of the cutting end of the drill.

Referring more in detail to the figures of the drawing, I show a drill 10 of elongated form partially broken away and having cutting surfaces 11 at one end adapted to engage and drill or bore a work piece W. At the opposite end of the drill 10 is a chuck or other holding device 12 for the drill, either the holder 12 for the work W or for the drill 10 being movable along a suitable base, a small portion only of which is shown. Preferably the work supporting member is rotatable but held against axial movement. As the above means constitute no part of the present invention and are parts usually found in deep hole drilling machines, it is not thought that further description of them will be necessary.

Slidably and adjustably positioned along the base 13 of the machine is a bracket or support 14 extending upwardly and having an opening therein through which the drill 10 may pass. As the cutting edge 11 at one end of the drill is of greater diameter than the intermediate or shank portion, and the chuck entering end may be of greater diameter, the opening provided within the member 14 is made ample to permit passage of the cutting end.

As shown in Fig. 1, annular flanges 15 are attached on opposite faces of the support 14, these flanges being of sufficiently greater diameter than the drill shank 10 so that the cutting end of the drill can pass therethrough. Housed within this support 14 and disposed between the flanges 15 are two opposed annular resilient bearing members 16 each U shaped in cross section and formed of suitable molded or otherwise made composite and non-metallic material. As shown in Fig. 1, each bearing 16 is housed within a ring member 17 having a flange at one end and the two bearing members are separated by an intermediate ring or spacing collar 18. In order to resiliently force portions of the bearing material 16 firmly against the circumferential surface of the shank 10, an annular spring of bent sheet metal 19 is positioned as shown in Fig. 1. By means of this spring 19 the inner annular portion of the bearing material 16 is forced closely and firmly but resiliently into contact with the shank of the drill.

Referring to the form of the bearing members 16 shown in Fig. 2, it will be seen that the opposed bearing members and their enclosing rings are housed within an annular member 20 having an integral and inwardly extending flange 21 at one end and being held therein by means of a threaded annular collar 22 at the opposite end. In Fig. 3 the form of rings 17 with their opposed bearing members 16 similar to those shown in Fig. 1 are housed within a cylindrical collar 23, there being a recess formed therein for the pair or rings at one end thereof and there being an annular plate or flange 24 disposed against the open end thereof.

What I claim is:

1. In a drilling machine, means to relatively rotate a work piece and drill, an intermediate rigid support for said drill having an opening therein through which said drill may pass, an annular packing fitting within said opening, and an annular spring closely engaging the packing and forcing said packing into contact with the outer surface of said drill throughout its periphery.

2. In a drilling machine, means to relatively rotate a work piece and drill, an intermediate rigid support for said drill having an opening therein through which said drill may pass, a resilient annular packing U-shaped in cross section fitting within said opening and closely engaging and surrounding the surface of said drill, and an annular spring therein forcing portions of said packing into contact with said drill.

JOHN C. DIXON